United States Patent
Peters et al.

[11] 3,861,801
[45] Jan. 21, 1975

[54] DEVICE FOR SAMPLING LASER BEAMS

[75] Inventors: William N. Peters, Ridgefield; Eugene R. Schlesinger, Wilton, both of Conn.

[73] Assignee: The Perkin-Elmer Corporation, Norwalk, Conn.

[22] Filed: June 18, 1973

[21] Appl. No.: 371,190

[52] U.S. Cl. ............................. 356/74, 350/162 R
[51] Int. Cl. ............................................ G01j 3/18
[58] Field of Search ................ 331/94.5 C, 94.5 A; 350/162 R; 356/74, 99

[56] References Cited
UNITED STATES PATENTS
3,549,239  12/1970  Brienza et al. .................. 350/162 R

*Primary Examiner*—Ronald L. Wibert
*Assistant Examiner*—F. L. Evans
*Attorney, Agent, or Firm*—John K. Conant

[57] ABSTRACT

This is a device for sampling beams of electromagnetic energy with minimum disturbance of the transmitted beam and consists of a pair of diffraction gratings, both having the same period, arranged in parallel opposed relation so that the major portion of the input beam is reflected out of the device from the first grating on which it impinges. The portion of the entering beam diffracted from the first grating impinges on the second grating and is diffracted therefrom in a direction parallel to the direction of the entering beam; the parallel sample beam may subsequently be specularly reflected from a suitable mirror surface so as to be directed parallel to, but laterally displaced from, the exit beam and will remain so despite variations in the angle of incidence of the entering beam. The double diffracted beam is the sample in which both the amplitude and phase of the entering beam is faithfully reproduced so that the sample can be used simultaneously to obtain the phase front (eg., tilt) and amplitude (i.e., intensity distribution) of the sampled beam. This permits continuous sampling of a beam and does not require critical alignment since the device is insensitive to variations in the angle of incidence of the input beam on the first grating. This device is adapted for sampling incoherent light beams, or coherent light beams such as laser beams, and the sampled beams may consist spectrally of a single wavelength or multi-wavelengths. With multi-wavelength input beams the beam portions at the respective wavelengths are all parallel, but slightly displaced, and arrangements of the device for operating with many wavelengths simultaneously without such displacement are disclosed. Devices of this invention are useful for sampling laser beams of any power, but are particularly useful for sampling high power laser beams.

5 Claims, 6 Drawing Figures

DEVICE FOR SAMPLING LASER BEAMS

BACKGROUND OF THE INVENTION

The present invention relates to devices for sampling beams of electromagnetic radiation, whether coherent, as from a laser, or incoherent for the purposes of monitoring intensity and phasefront distributions and alignment determination, for example. In particular, the invention is a sampling device which does not alter the transmitted main and sample beams and in which the amplitude and phase of the input beam are faithfully reproduced in the output main and sample beams. The arrangement of this invention is especially suited for sampling high power laser beams.

A conventional way of sampling laser or other light beam would be with a beamsplitter but, the wavefront perturbations produced in the portion of the beam passing through the beamsplitter potentially alters the phase and amplitude in relation to the reflected portion of the beam. Moreover, beamsplitters are usually unsuitable for sampling high power laser beams; for example, since the heat produced in any known type of beamsplitter could possibly destroy it, or introduce phase perturbation of the transmitted wavefront resulting from induced thermal gradients, and a suitable means for cooling the beamsplitter to the extent required is not generally available.

BRIEF DESCRIPTION OF THE INVENTION

The beam sampling device of the present invention consists essentially of a pair of diffraction gratings mounted with their ruled surfaces in parallel opposed relation.

The parallel gratings are arranged at an angle to the input beam in a position such that the incoming beam impinges on the ruled surface of one grating which specularly reflects a portion of the beam out from between the two gratings and diffracts a portion to the other grating. The other grating again diffracts a portion of the previously diffracted portion and directs the doubly diffracted beam portion out from between the two gratings in a direction that is parallel to the path of the incoming beam to the first grating.

The two gratings forming the device both have the same period as determined by the spacing of the rulings, but may have different efficiencies (ie. proportion of diffracted to specularly reflected light). The first grating, on which the incoming beam impinges is preferably made to have a very low efficiency, so that it specularly reflects the major portion of the incoming beam as the main transmitted beam, and diffracts a very minor portion as the sample. The second grating, on which the diffracted beam portion from the first grating impinges, is preferably as efficient as possible so as to diffract again as much as possible of the diffracted beam portion it receives and thus conserve the sample beam power as much as possible prior to measuring it. From the second grating the doubly diffracted beam is directed to a suitable wavefront sensor for determining desired beam characteristics such as phase and/or the intensity distribution, alignment, etc.

The particular advantages of the beam sampling device of this invention are that it permits continuous sampling, it does not alter the phase and amplitude of the input beam so that they are faithfully reproduced in both the output main beam and the output sample beam, and the sample beam is parallel to and an accurate replica of the input beam even if there are large frequency and/or incident angle variations in the input beam, so that the output sample beam can be used to simultaneously detect the alignment and amplitude of the input beam. Additionally, since the input beam, and the output and sample beam portions do not pass through the gratings, which are critical elements of the device, but are incident on only one side thereof, provision for cooling the gratings is easily accomplished by known techniques and arrangements, such as by flowing a coolant through ducts that are in the gratings or are in contact with the back surfaces of the gratings.

BRIEF DESCRIPTION OF THE DRAWINGS

The features, objects and advantages of the sampling device of the present invention will be apparent from the following detailed description of illustrative embodiments of the invention shown in the accompanying drawings in which.

DETAILED DESCRIPTION OF THE INVENTION

Figure 1:
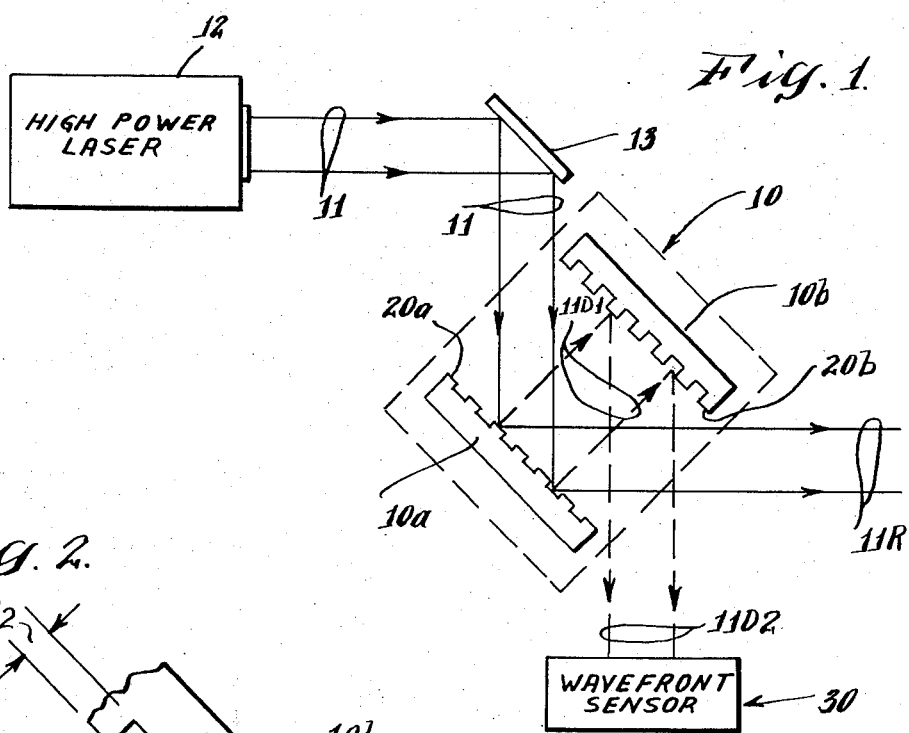
FIG. 1 is a schematic view of the basic structure of the invention showing it in a typical configuration with detecting means positioned for detecting parameters of the wavefront such as intensity and phase distributions, alignment, etc.

Referring to FIG. 1 of the drawings, the sampling device 10 is adapted for sampling a beam 11 of light, such as a laser beam from a laser 12, and consists essentially of a pair of diffraction gratings 10a and 10b mounted in parallel relation with their ruled surfaces 20a and 20b facing each other.

In a typical arrangement as illustrated in FIG. 1 the sampling device 10 and the laser 12 are mounted so that the laser beam 11 is reflected by a mirror 13 at an angle, suitably 45° as shown, into the device 10. This is simply to provide a convenient and compact mounting arrangement of the elements in an operative system; this arrangement, incorporating a fold mirror 13, also has the advantage that the path of the main output beam 11R from the device can be made substantially parallel to the path of the laser beam 11 emerging from the laser 12 by appropriate selection of the angular orientation of the mirror 13.

The mirror 13 may be mounted for movement about two axes under the control of servo mechanisms (not shown) actuated by an alignment sensor which would be mounted in the path of the output sample beam 11D2, for maintaining the laser beam 11 incident upon the sampling device 10 at a given angle. Such a servo-mechanism and alignment sensor combination would thus automatically readjust the angular position of the mirror 13 to compensate for changes in the beam paths due to angular perturbations introduced by the laser itself, or due to changes in angular position of other optical elements of the system.

It will be appreciated, however, that the mirror 13 is not essential to the operation of the device and may be omitted, in which case the laser beam 11 would be directed into the device 10 along a straight path.

The device 10 is interposed in the path of the input laser beam 11 at an angle and in a position so that the incoming beam impinges on the ruled surface 20 a of the first diffraction grating 10a. The angular orientation of the device 10 relative to the incoming beam 11 is at any suitable angle less than 90° such that the portion of the incoming beam 11 which is specularly reflected from grating 10a passes directly out from between the two gratings as the main output beam 11R (full lines) transmitted by the device, as shown, and such that the portion of the incoming beam 11 that is diffracted by the grating 10a, designated 11D1 (dash lines) impinges on the ruled surface 20b of the second grating 10b which diffracts the major portion of the diffracted beam 11D1 and directs a doubly diffracted beam 11D2 (dash lines) out from between the two gratings. The doubly diffracted output beam 11D2 is the sample beam which, for the grating arrangement illustrated, would pass through the path of the main output beam 11R. In applications where this passage of the beam 11D2 through beam 11R is undesirable, the relative orientation of the rulings of the two gratings can be changed, for example, by 90°, and the second grating 10b repositioned so that the sample beam 11D2 passes to one side of the main transmitted beam 11R.

Figure 2:
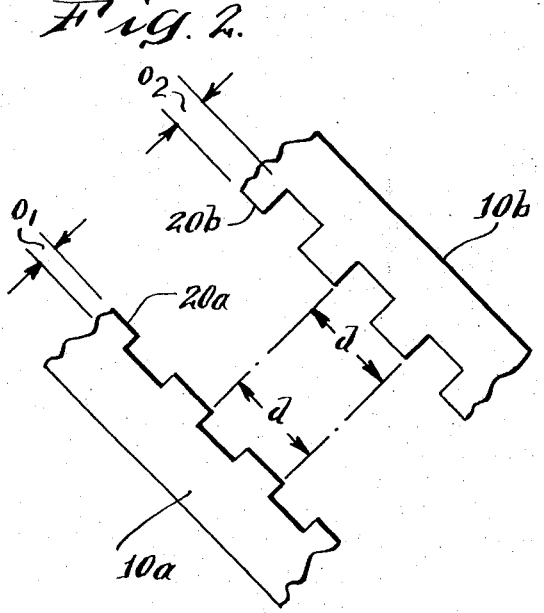
FIG. 2 is an enlarged view of a portion of each of the gratings of the device illustrating that the period is the same for each while their efficiencies may differ.

The two gratings 10a and 10b are both made to have the same period which is determined by the distance d between successive grooves of the rulings on the ruled surfaces 20a and 20b as indicated in FIG. 2. The particular spacing and shape of the grooves of the rulings are selected with reference to the principal wavelength of interest of the laser 12. It should be noted, that, while a particular groove configuration of the ruled surfaces 20a, 20b is illustrated in FIG. 2, other groove configurations known in the art could also be used, the only critical factors being that the two gratings must be parallel and the rulings must be of the same period. Also in accordance with the known principals of interference, the light from successive grooves must be in phase for the grating to be operative.

The appropriate configuration is defined by the equation:

$$\lambda = (d \sin + d \sin\beta)/m$$

where:
$\lambda$ is the wavelength of interest of the laser
$d$ is the distance between successive grooves of the rulings
$\alpha$ is the angle of incident rays with respect to a line normal to the ruled surface of the grating
$\beta$ is the angle of diffraction with respect to the normal, the plus sign indicating that $\beta$ is on the same side of the normal as $\alpha$ (a minus would indicate that it is on the opposite side)
$m$ is the order of diffracted light; it is usually a small integer and is suitably 1 in the present instance. When $m$ is zero the grating acts as a mirror, the wavefronts of all wavelengths being superposed.

In operation it is desired to take by diffraction, the smallest amount of light necessary for obtaining a sample beam 11D2 that will contain sufficient light for making measurements desired, while maintaining the maximum amount of light in the input beam 11 from the laser 12 in the main output beam 11R transmitted by the device 10. For this purpose the first grating 10a is made quite inefficient in the sense that ratio of specularly reflected light to the amount of light diffracted is as high as possible consistent with obtaining enough diffracted light for measuring purposes; conversely the efficiency of the second grating 10b is made as high as possible so that the maximum amount of the diffracted light received from the first grating 10a (beam 11D1 is in turn diffracted from the second grating 10b into the doubly diffracted sample output beam 11D2. The efficiencies of the gratings are affected by the depth of the rulings, shallow rulings being less efficient and diffracting less light than deeper rulings. As shown in FIG. 2, the depth of the rulings of grating 10a is less than the depth of the rulings of the grating 10b.

Here it will be noted that by using a pair of gratings 10a, 10b having the same period; and arranged in the manner described, as opposed to using a single grating or by replacing the second grating with a mirror, the affect of any dispersion produced by the first grating 10a and affecting the diffracted beam 11D1, is cancelled out by the dispersion produced by the second grating 10b and affecting the doubly diffracted sample output beam 11D2. Specifically, since the two gratings 10a and 10b are in opposed relation and their rulings are the same period, the angle of incidence and the angle of diffraction at the first grating 10a equal respectively the angle of diffraction and angle of incidence at the second grating 10b so that the dispersions produced in each are substantially the same but opposite in effect so that they negate each other. Thus the phase and amplitude (ie. intensity distribution) in the input beam 11 is faithfully retained in the doubly diffracted sample output beam 11D2. Also, the output sample beam 11D2 is parallel to the input beam 11 and remains so despite even large variations in the frequency and/or incidence angle of the input beam 11.

Figure 3:
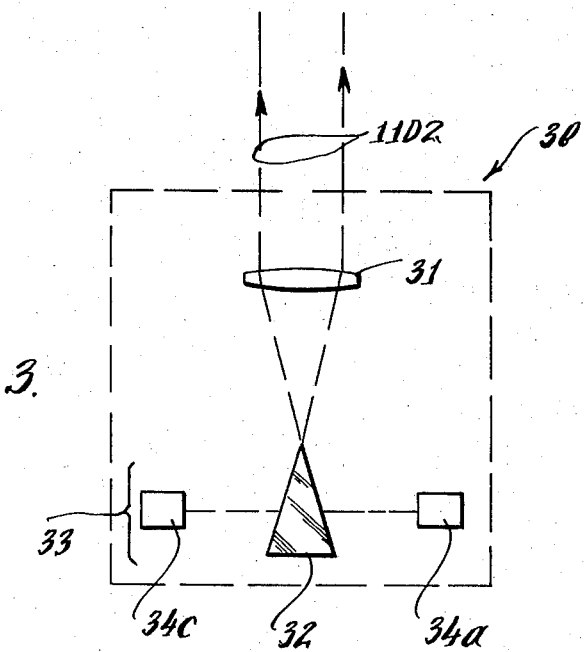
FIG. 3 is a schematic view illustrating one type of wavefront sensor that would be suitable for use with sampling devices of this invention, showing the sensor in the output sample beam of the FIG. 1 embodiment.
Figure 4:
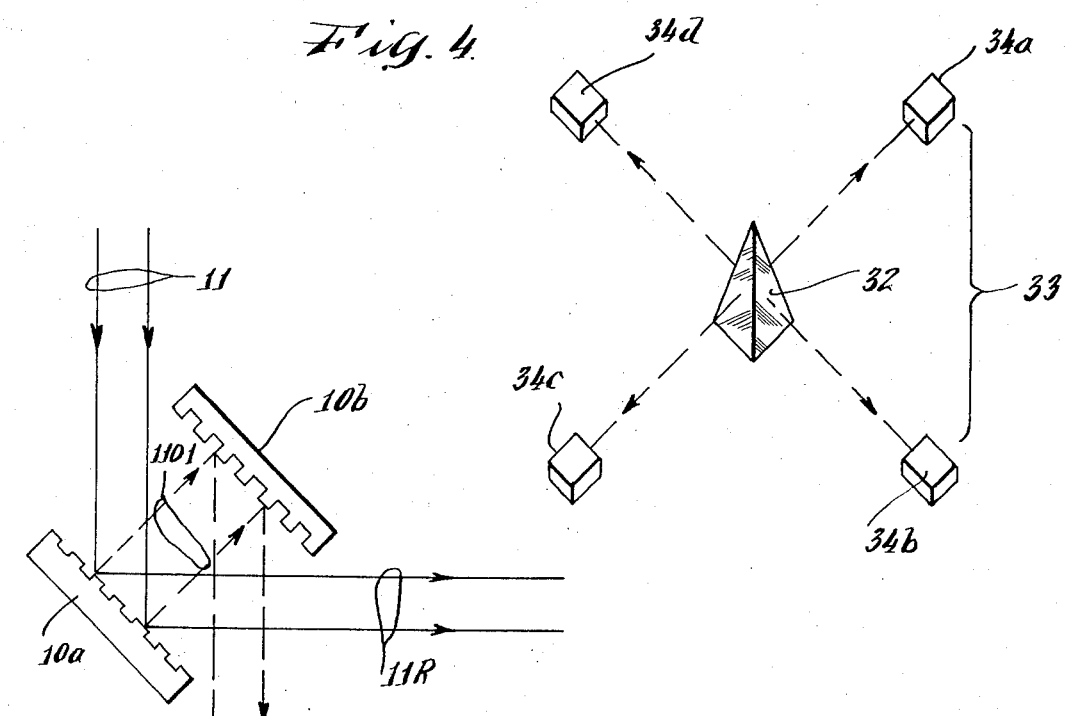
FIG. 4 is an isometric schematic view of the pyramidal prism and light measuring cells of the FIG. 3 wavefront sensor.

The laser beam 11 is monitored, for example, for intensity and phase front distribution and for alignment, by means of an appropriate wavefront sensor 30 in the path of the sample beam 11D2. FIGS. 3 and 4 illustrate a typical form of wavefront sensor for measuring the alignment (ie. tilt of the wavefront) and the power level of the sample output beam 11D2, and thus for measuring the alignment and power level of the input beam 11 (and by suitable calibration, the alignment and power level of the main output beam 11R). The wavefront sensor 30 illustrated has a lens 31 focussing the sample beam 11D2 onto a pyramidal prism 32 of an image tracker 33 which is formed by the prism 32 and light measuring cells 34a, 34b, 34c and 34d aligned respectively with the sides of the prism to receive and measure the intensity of light reflected from the sides of the prism. The prism 32 is shown as having four sides, and consequently four light measuring cells, 34a–d, but it will be appreciated that the number of sides on the prism, and hence the number of cells 34, is not critical.

The prism 32 is located so that its apex is in the focal plane of the lens 31, and so that when the laser 12 is aligned as desired, the laser image formed by lens 31 is divided into four equal parts by each part being reflected from one side of the prism and detected by the light measuring cell 34a–d that is aligned with the respective prism side. When the laser 12 is in the desired alignment the energy measured at each cell 34a–d will be the same. If, however, the output of the laser 12 is out of alignment, the angular displacement of its beam 11 causes a lateral translation of the image formed in the plane of the apex of the prism 32, thus causing an imbalance of the energy detected by the respective light measuring cells 34a–d. The cells 34a–d are suitably a type adapted to produce electrical output signals proportional to the incident energy they detect and the output signals from the respective cells 34a–d are thus adapted to be utilized to indicate the amount of angular misalignment of the beam 11 and/or to actuate servo control mechanisms to adjust the alignment of the beam 11, as by adjusting the orientation of the mirror 13. Such a monitoring and servo control arrangement is thus adapted to monitor and readjust the direction of the main input beam 11 to keep it pointing in a particular direction desired.

Figure 5:
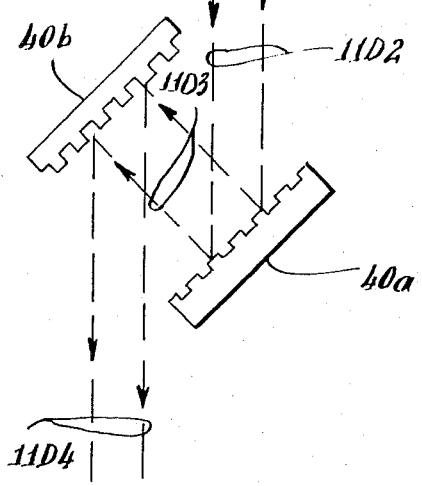
FIG. 5 is a schematic view of an embodiment in which a second pair of parallel opposed diffraction gratings is arranged in the path of the sample output beam, and wherein the relative translational shifts between wavefronts of different wavelengths introduced by the first grating pair are compensated by those of the second grating pair.

In the FIG. 1 configuration the sample output beam 11D2 is parallel to the input beam 11, but spaced to the right. FIG. 5 shows a modification in which the beam 11D2 is shifted to the left and emerges as sample beam 11D4 whose axis is colinear with the optical axis of the input beam 11. For this purpose, another parallel opposed pair of diffraction gratings 40a and 40b both having the same period are interposed in the path of the beam 11D2 so that the beam 11D2 impinges on the ruled surface of grating 40a. The period of all the gratings 10a, 10b and 40a, 40b should be the same to affect complete cancellation of dispersion.

The grating 40a is at the same angle relative to the beam 11D2 as the grating 10b, but in the opposite direction so that the angle of incidence of beam 11D2 on grating 40a equals the angle of diffraction at grating 10b.

In the embodiment shown in FIG. 5, the gratings 40a and 40b are in vertical alignment with the gratings 10b and 10a respectively. The beam 11D3 diffracted from grating 40a impinges on grating 40b and is diffracted therefrom, as beam 11D4, into a path that is colinear with the input beam 11. By using a pair of similar gratings 40a and 40b for shifting the position of the sample beam in this manner, dispersion produced by one grating pair is cancelled by an opposite dispersion produced by the other grating pair as described above. By thus shifting the sample beam 11D2 so as to cancel the net dispersion introduced by the grating pair 10a, 10b the sampled output beam 11D4 maintains its angular and translational registration for all wavelengths and incident of angles of the input beam 11, and the angle, phase and amplitude (intensity distribution) can be detected for a multiple wavelength or broad band beam, using conventional angle, phase and amplitude detecting devices.

Figure 6:
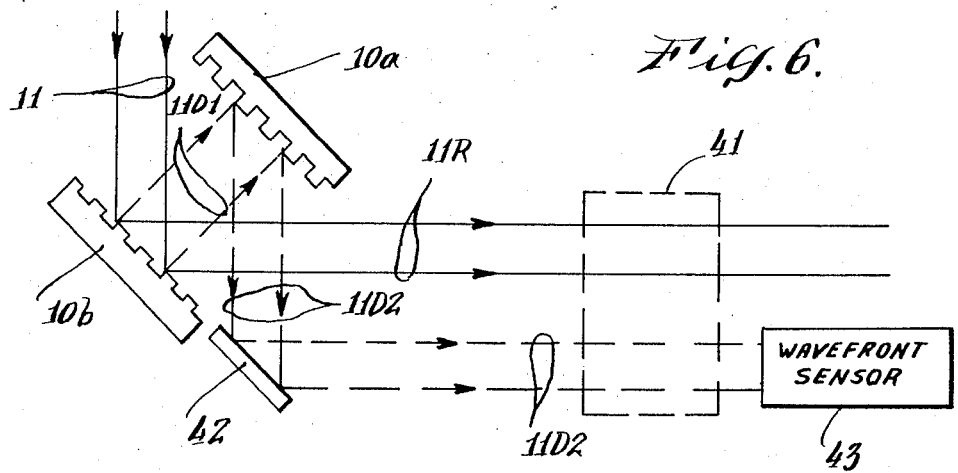
FIG. 6 is a schematic view of an embodiment in which the sample output beam is reflected into a path parallel to the path of the main beam so as to pass through the same subsequent optics as the main beam before being detected by the wavefront sensor, so that the optics affect both the main and sample beams in similar fashion.

FIG. 6 shows a modification in which there may be a group of optics, indicated at 41, in the output beam 11R. In this embodiment a plane mirror 42 is placed angularly across the exit path of the sample output beam 11D2 for redirecting the sample beam into a path parallel, and closely adjacent, to the main output beam 11R, so as to pass through the same group of optics 41 as the beam 11R, before impinging on a wavefront sensor 43. The mirror 42 is suitably parallel with the first grating 10a, and it may be a separate mirror, as shown, or, for structural simplicity, it may be an extension of the grating 10a with a mirror rather than a ruled surface. Since with this FIG. 6 arrangement the affects produced by the optics 41 on the main output beam 11R similarly affect the sample beam 11D2 as measured by the wavefront sensor 43, phasefront changes, variations in amplitude, or angular shifts produced by the adjustment changes occurring in the optics 41 can be accurately and directly measured and/or compensated by adjustment, such as by adjusting the position of the laser 12 or by servo control of the angular orientation of a mirror 13 (FIG. 1) in the path of the input beam 11. The wavefront sensor 43 could suitably be a type such as the wavefront sensor 30 described above with reference to FIGS. 1 and 3.

What is claimed is:

1. A device for taking a sample from a beam of light, such as a laser beam, without altering the phase or intensity of the main beam exiting from the device, said device comprising first and second diffraction gratings mounted in parallel spaced relation, the opposed surfaces of the gratings having rulings thereon, the rulings on both gratings having the same period, the rulings on the first grating being such as to specularly reflect a substantial portion and to diffract a minor portion of the beam of light impinging thereon while the rulings on the second grating are such as to diffract the major portion of a beam of light impinging on it, the gratings being positioned for a beam of light that is being sampled to impinge on the ruled surface of the first grating at an angle less than 90° and being spaced apart at least enough for the specularly reflected portion of the said beam from the first grating to be reflected out, unobstructed, from between the gratings as the main beam exiting from the device, while the portion of said beam diffracted from the first grating impinges on the second grating at an angle such that at least a portion of the diffracted beam portion impinging on the second grating is diffracted therefrom out from between the gratings, whereby the double diffracted portion of said beam, which is the sample portion, leaves the second grating in a path parallel to the path of the beam impinging on the first grating and retains the amplitude and phase of the beam initially directed to the first grating.

2. The device of claim 1 including means interposed in the path of a doubly diffracted beam of light from the second grating for detecting the intensity and phase of the light in said doubly diffracted beam and the angular direction of that beam, and hence the intensity, phase, and direction of the beam impinging on the first grating.

3. The device of claim 1 including third and fourth diffraction gratings mounted in parallel spaced relation with their opposed surfaces having rulings which diffract a portion of light impinging thereon; the period of the rulings on the third and fourth gratings being the same; said third and fourth gratings being mounted for light diffracted from the second grating to impinge on the ruled surface of the third grating at an angle less than 90° and for a portion of the light diffracted from the third grating to impinge on the ruled surface of the fourth grating which in turn diffracts a portion of the diffracted light it receives into a path parallel to said beam of entering light impinging on the first grating, whereby the beam of light diffracted from the fourth grating contains any multiple wavelengths of said entering light in the same lateral spacing and relative position as said entering light.

4. The device of claim 1 including a specular reflecting surface mounted in the path of said doubly diffracted light from the second grating and positioned to specularly reflect said doubly diffracted light into a path parallel and close to the path of said specularly reflected main beam of light from the first grating, whereby said main beam and the specularly reflected double diffracted light are adapted for both to pass at the same time through any group of optical elements interposed in the path of said main beam from the first grating.

5. The device of claim 4 including optical elements through which said main beam and the specularly reflected double diffracted light both pass, and detecting means in the path of said diffracted light from said optical elements for detecting the phase and intensity of said light and its angular direction and hence the phase, intensity, and the angular direction of the specularly reflected main beam.

* * * * *